(12) United States Patent
Yu et al.

(10) Patent No.: US 8,162,677 B2
(45) Date of Patent: Apr. 24, 2012

(54) JUNCTION BOX AND CONDUCTOR STRIP CONNECTION DEVICE THEREOF

(75) Inventors: Chen-Yu Yu, Taoyuan Hsien (TW);
Chin-Chu Huang, Taoyuan Hsien (TW);
Ren-De Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/019,109

(22) Filed: Feb. 1, 2011

(65) Prior Publication Data
US 2012/0071024 A1    Mar. 22, 2012

Related U.S. Application Data

(60) Provisional application No. 61/383,812, filed on Sep. 17, 2010.

(51) Int. Cl.
*H01R 13/66* (2006.01)
(52) U.S. Cl. ........ 439/76.2; 439/110; 136/244; 136/246
(58) Field of Classification Search ............ 439/76.2, 439/110; 136/244, 246
See application file for complete search history.

(56) References Cited

U.S. PATENT DOCUMENTS

| | | | |
|---|---|---|---|
| 7,530,837 B2 * | 5/2009 | Nieleck et al. | 439/441 |
| 7,932,461 B2 * | 4/2011 | Johnson et al. | 136/246 |
| 2010/0216336 A1 * | 8/2010 | Quiter et al. | 439/567 |
| 2010/0218802 A1 * | 9/2010 | Quiter | 136/244 |
| 2011/0003519 A1 * | 1/2011 | Oka et al. | 439/879 |
| 2011/0108085 A1 * | 5/2011 | Quiter | 136/244 |
| 2011/0158337 A1 * | 6/2011 | Li et al. | 375/260 |
| 2011/0195585 A1 * | 8/2011 | Feldmeier et al. | 439/110 |

* cited by examiner

*Primary Examiner* — Gary F. Paumen
(74) *Attorney, Agent, or Firm* — Kirton McConkie; Evan R. Witt

(57) ABSTRACT

A conductor strip connection device for a junction box of a solar module is disclosed and comprises a contact member having a contact segment for connecting to a conductor strip, a suppressing member having a suppressing part configured to cooperate with the contact segment of the contact member for securing a conductor strip, and a fastening member configured to assemble the suppressing member and the contact member together or disassemble the suppressing member from the contact member for allowing the suppressing member to cooperate with the contact segment of the contact member so as to secure or release the conductor strip.

17 Claims, 18 Drawing Sheets

JUNCTION BOX AND CONDUCTOR STRIP CONNECTION DEVICE THEREOF

CROSS-REFERENCE TO RELATED APPLICATIONS

This application claims the benefit of prior U.S. provisional application 61/383,812, which is entitled "CONNECTION OR JUNCTION BOX" and filed on Sep. 17, 2010. The entire disclosures of the above-captioned application are incorporated herein by reference.

FIELD OF THE INVENTION

The present invention relates to a junction box, and more particularly to a junction box for solar module and a conductor strip connection device thereof.

BACKGROUND OF THE INVENTION

There are several advantages of photovoltaic solar power that make it one of the most promising renewable energy sources in the world. The photovoltaic solar power is free, needs no fuel and produces no waste or pollution, and the solar power generator requires little maintenance and no supervision and has a life of 20-30 years with low running costs. Solar power generators are simply distributed to homes, schools, or businesses, where their assemblies require no extra development or land area and their functions are safe and quiet. Remote areas can easily produce their own supply of electricity by constructing as small or as large of a system as needed.

Generally, the solar or photovoltaic module for generating electric energy from sunlight comprises a plurality of solar or photovoltaic cells. The solar cells in a solar module are usually connected to each other by thin conductor strips (i.e. conductor ribbons). These thin conductor strips are routed out of the solar module on the side facing away from the sun. The thin conductor strips are mostly made of copper foils and protruded from the rear side of the solar module (i.e. solar panel). These flexible and thin conductor strips are very sensitive and difficult to contact. Therefore, one or more junction boxes are employed for the solar module and thin conductor strips are manually contacted with electrical terminal receptacles of the junction box. In addition, the junction box is an integral part of a solar or photovoltaic system and it provides electrical connections between the solar cells of the individual solar module (i.e. solar panel) and between the solar modules and other components of the system (i.e. DC/AC inverter). Generally, the junction box is disposed on a rear surface of the solar panel and has electrical connection mechanism in the interior for contacting the thin conductor strips of the solar modules and conducting the electrical current generated by the solar modules to the outside. Without a junction box, the solar modules could not work properly.

Generally, plural solar modules are operated in series connection, wherein a so called bypass diode is anti-parallel connected to each solar module. The bypass diode is disposed inside the junction box and fastened and connected to the electrical connection mechanism of the junction box. In a case of a solar module is shaded or does not produce electricity because of defect, this solar module would lower the power of the solar modules in series connection or even suffers damage without bypass diode. This is because that if a solar cell within a solar cell group of the solar module is partially shaded, this shaded solar cell acts as a blocking diode or resistor within the circuit of the solar cell group, which may result in a damage of the shaded solar cell and result in the entire solar cell group of the solar module no longer being able to supply electric energy. The above-mentioned situations can be avoided by using the bypass diode of the junction box, because the current flows through the diode and is sustained. In other words, the bypass diodes are electrically connected in an anti-parallel manner with respect to the solar cell groups and have the effect that the current flow through the solar module is led past solar cell groups that only supply low power, i.e. the terminals of this solar cell group of a solar module are short-circuited by the bypass diode and the corresponding cell group is bypassed thereby. Thus, such a solar cell group does no longer contribute to the overall performance of the solar module, but the overall current flow through the solar panel is substantially unobstructed and a damage of individual solar cell is avoided.

It is obviously that due to the mechanical conditions particularly the form of the thin conductor strips and the bypass diodes, a number of difficulties occur when constructing the junction box. In addition, due to the manual connecting, the assembly and installation of the thin conductor strips and the bypass diodes with the electrical connection mechanism inside the junction box is cost and laborious. Up to now, the conventional junction box is complex in construction and installing the junction box is laborious. In addition, the conventional junction box doesn't provide reliable electrical connections and the durability of the junction box is low. It is therefore desirable to provide a junction box that is simple in structure, cost-effective, durable enough to withstand a wide range of environment conditions and easily be installed and maintained, while maintaining a high-quality, reliable electrical connections between the components of a solar or photovoltaic system.

SUMMARY OF THE INVENTION

It is an object of the present invention to provide a junction box with conductor strip connection devices capable of assembling, fastening and coupling the thin conductor strips of the solar module to the junction box easily and conveniently.

It is another object of the present invention to provide a junction box with conductor strip connection devices capable of assembling, fastening and coupling the thin conductor strips of the solar module to the junction box without using auxiliary tools.

It is another object of the present invention to provide a junction box for solar modules, which is simple in construction, cost-effective, durable enough to withstand a wide range of environment conditions and easily be assembled, installed and maintained.

It is still an object of the present invention to provide a junction box for solar modules, which can maintain a high-quality, reliable electrical connections between the components of a solar or photovoltaic system.

In accordance with one aspect of the present invention, a junction box comprises a housing having an opening for introducing a plurality of conductor strips, and an electrical connection mechanism disposed in a receptacle of the housing. The electrical connection mechanism comprises a plurality of conductor strip connection devices separately disposed on an inner surface of the housing for connecting to the conductor strips, and a current-path arrangement module comprising a plurality of electricity conveying elements and a plurality of electronic components. The electricity conveying elements are connected with the conductor strip connection devices respectively, and each electronic component is connected with two adjacent electricity conveying elements. Each of the conductor strip connection devices comprises a contact member having a contact segment, a suppressing member having a suppressing part configured to cooperate with the contact segment of the contact member for securing a corresponding conductor strip; and a fastening member configured to assemble the suppressing member and the contact member together or disassemble the suppressing member from the contact member for allowing the suppressing member to cooperate with the contact segment of the contact member so as to secure or release the conductor strip.

In accordance with another aspect of the present invention, a conductor strip connection device for a junction box of a solar module comprises a contact member having a contact segment for connecting to a conductor strip, a suppressing member having a suppressing part configured to cooperate with the contact segment of the contact member for securing a conductor strip, and a fastening member configured to assemble the suppressing member and the contact member together or disassemble the suppressing member from the contact member for allowing the suppressing member to cooperate with the contact segment of the contact member so as to secure or release the conductor strip.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
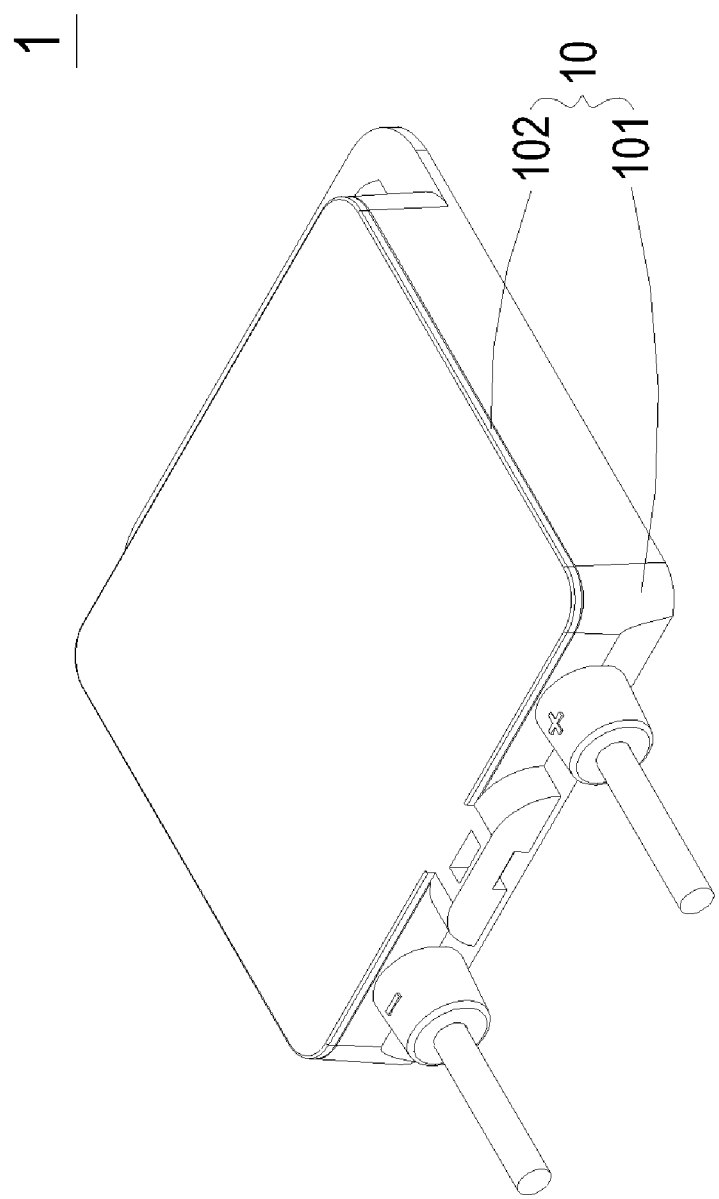
FIG. 1 is a schematic view showing a junction box for solar modules according to a preferred embodiment of the present invention.

Please refer to FIG. 1, which is a schematic view showing a junction box for solar modules according to a preferred embodiment of the present invention. The junction box 1 of the present invention includes a housing 10 made of durable plastic that can stand the external weather influences for at least 20 years and has electrical insulation properties. The housing 10 includes a base 101 and a cover 102, which is detachably fastened to or engaged with the base 101. The housing 10 has at least one opening formed on the bottom of the base 101 for introducing the conductor strips of the solar modules into the interior of the housing 10. The housing 10 of the junction box 1 can be fixed or attached to the rear surface of the solar module (not shown in FIG. 1).

Figure 2A:
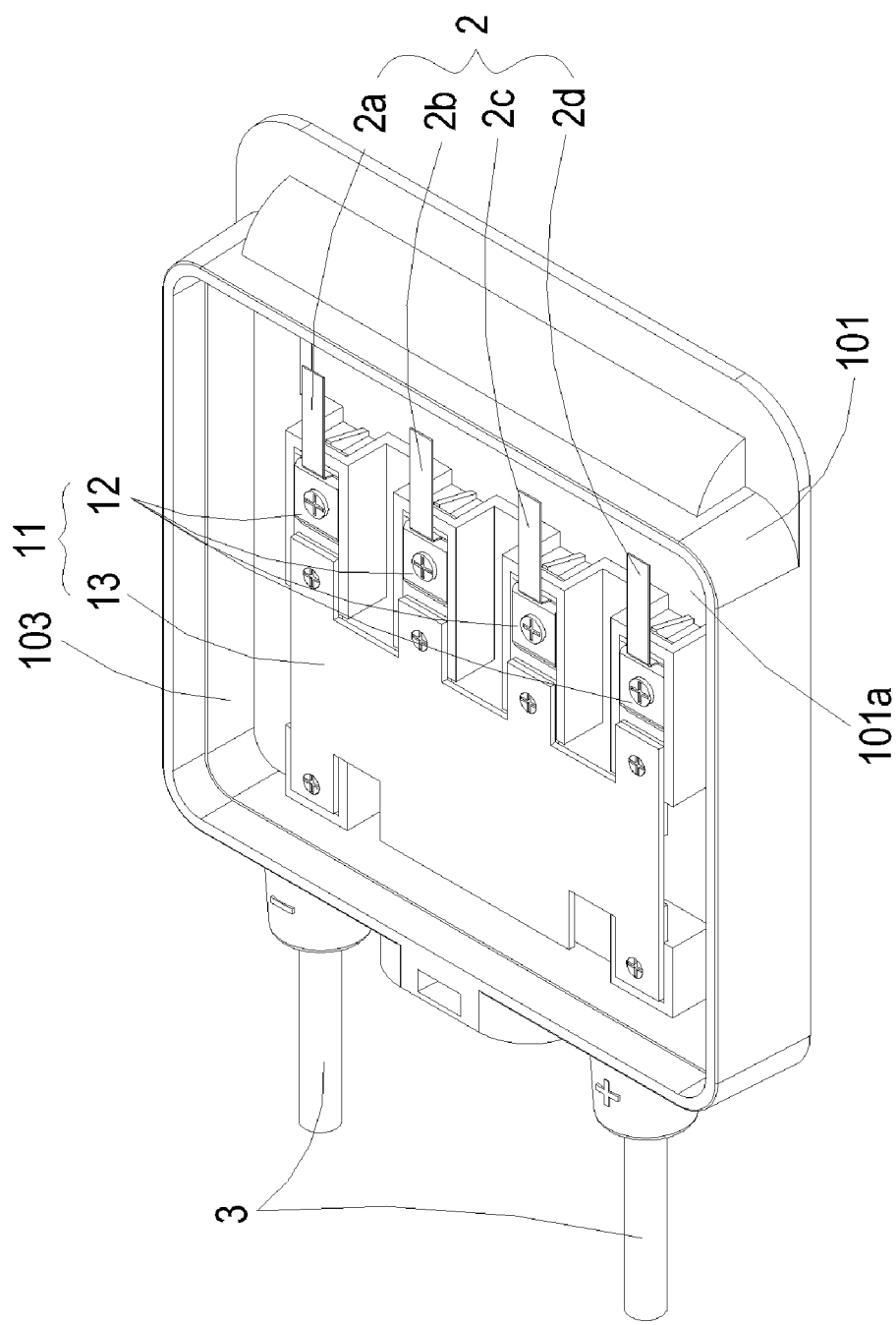
FIG. 2A is a schematic view showing an electrical connection mechanism of the junction box of FIG. 1.

FIG. 2A is a schematic view showing an electrical connection mechanism of the junction box of FIG. 1. As shown in FIG. 2A, the junction box 1 includes an electrical connection mechanism 11 disposed in a receptacle 103 of the base 101 and configured to connect with the conductor strips 2 of the solar modules through the opening 101a of the base 101 and two electrical cables 3. The electrical connection mechanism 11 includes a plurality of conductor strip connection devices 12 and a current-path arrangement module 13, which is detachably connected with the conductor strip connection devices 12 and the electrical cables 3. The conductor strip connection devices 12 are separately disposed and mounted on an inner surface of the base 101 and configured to contact and connect with the conductor strips 2 of the solar modules, for example four flat and thin conductor strips 2a, 2b, 2c, 2d. Preferably, conductor strip connection devices 12 are secured, fastened or attached to the inner surface of the base 101 by engaging, screwing, embedding, insertion molding, locking or adhesive, and it is not limited thereto.

Figure 3A:
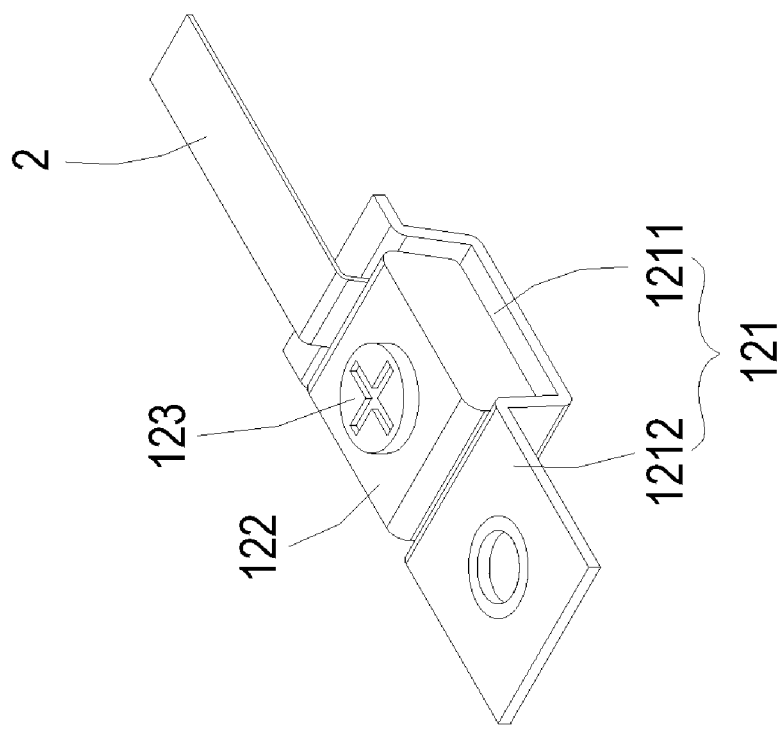
FIG. 3A a schematic view showing the conductor strip connection device of the electrical connection mechanism of FIG. 2.
Figure 3B:
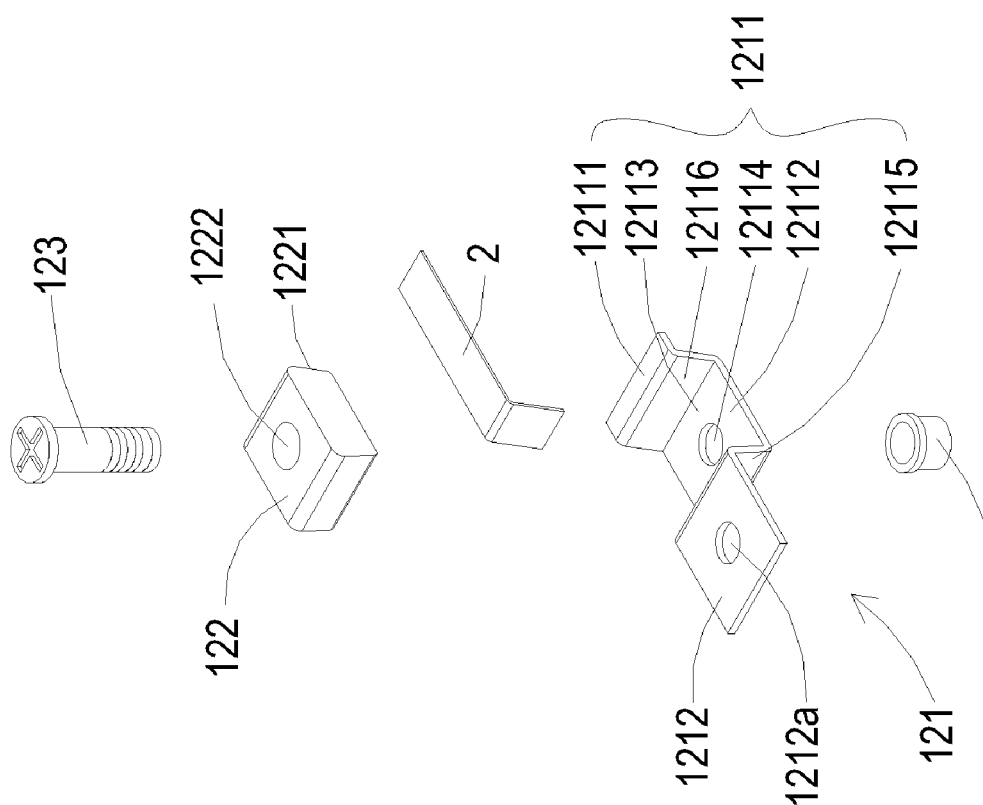
FIG. 3B is an exploded diagram of the electrical connection mechanism of FIG. 3A.

FIG. 3A is a schematic view showing the conductor strip connection device of the electrical connection mechanism of FIG. 2A; and FIG. 3B is an exploded diagram of the conductor strip connection device of FIG. 3A. As shown in FIGS. 2A, 3A and 3B, each of the conductor strip connection devices 12 includes a contact member 121, a suppressing member 122 and a fastening member 123. The contact member 121 is made of metal material and includes a contact segment 1211 and a fixing segment 1212. The contact segment 1211 is configured to contact with a conductor strip 2 of the solar module. The fixing segment 1212 is connected with the contact segment 1211 and configured to connect with a corresponding electricity conveying element of the current-path arrangement module 13 by fastening element. The suppressing member 122 is made of metal material and includes a suppressing part 1221 configured to cooperate with the contact segment 1211 of the contact member 121 for clamping and securing the conductor strip 2 of the solar module. Preferably, the suppressing part 1221 is one sidewall of the suppressing member 122. The fastening member 123 is configured to assemble the suppressing member 122 and the contact member 121 together or disassemble the suppressing member 122 from the contact member 121 so that the suppressing member 122 can cooperate with the contact segment 1211 of the contact member 121 for clamping or releasing the conductor strip 2.

In an embodiment, the contact segment 1211 comprises a first portion 12111 and a second portion 12112. The second portion 12112 is connected with and between the first portion 12111 and the fixing segment 1212, and the second portion 12112 is offset from the first portion 12111 and the fixing segment 1212 and forms a receiving portion 12113 for receiving the suppressing member 122. In an embodiment, the second portion 12112 of the contact segment 1211 includes a first through hole 12114 and two sidewalls 12115, 12116, and the suppressing member 122 includes a second through hole 1222. The fixing segment 1212 includes a through hole 1212a. Preferably, the suppressing member 122 is a wedge. Preferably, the fastening member 123 is quick release screw, and it is not limited thereto.

When the user wants to assemble and connect the conductor strip 2 with the junction box 1, one end portion of the conductor strip 2 can be folded and placed on the contact segment 1211 of contact member 121 so that the conductor strip 2 can contact with one sidewall 12116 of the second portion 12112 and the first portion 12111 of the contact member 121. Then, the suppressing member 122 is installed into the receiving portion 12113 of the second portion 12112 for pressing the conductor strip 2, and the fastening member 123 is employed to pass through the second through hole 1222 of the suppressing member 122 and the first through hole 12114 of the contact member 121 and couples with a coupling element 124. Therefore, the suppressing member 122 can cooperate with the contact segment 1211 of the contact member 121 for clamping the conductor strip 2 and the conductor strip 2 can be securely fastened to the conductor strip connection device 12.

Figure 2B:
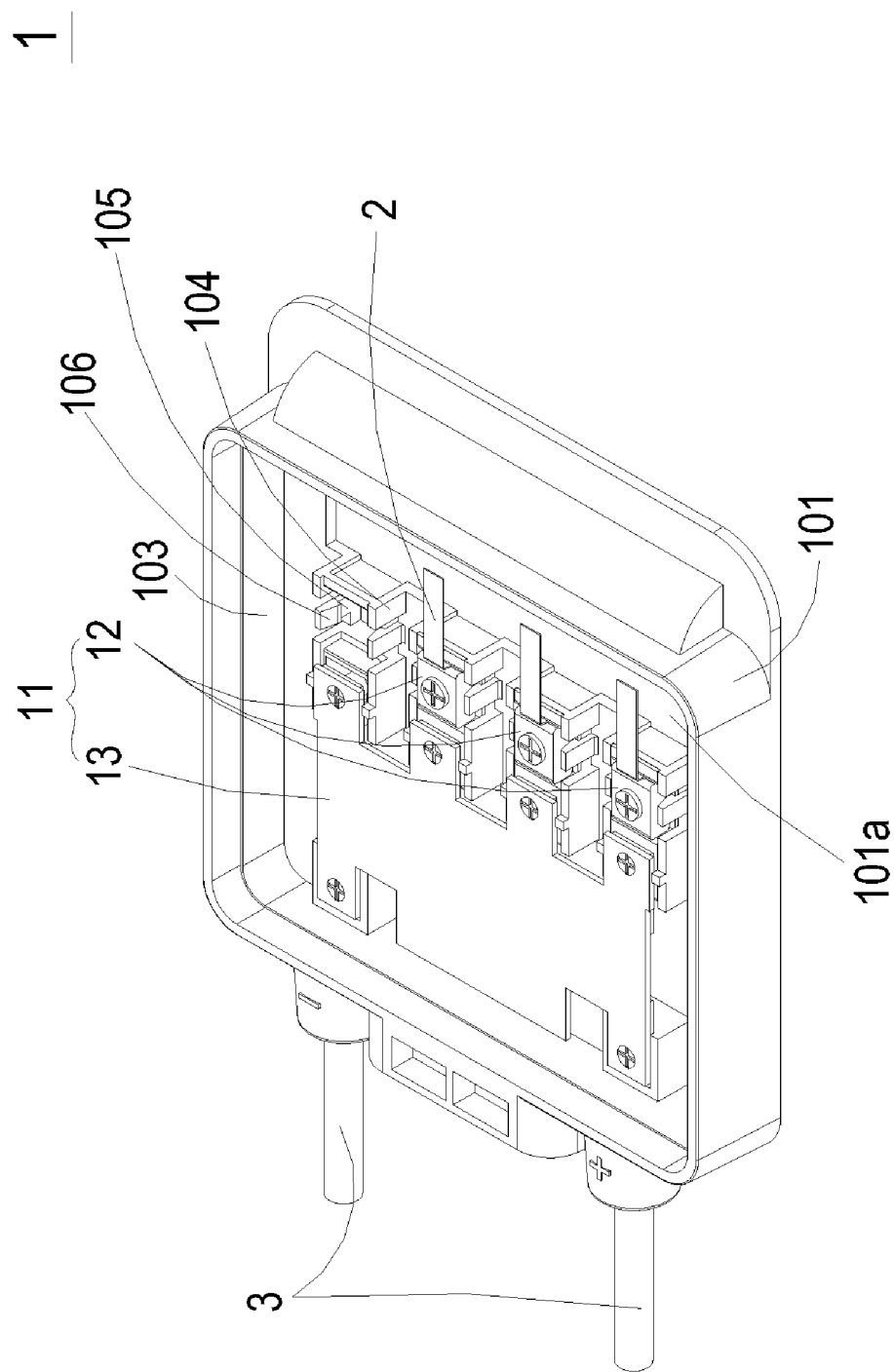
FIG. 2B is another schematic view showing an electrical connection mechanism of the junction box of FIG. 1.

In an embodiment, as shown in FIG. 2B, the contact member 121 of the conductor strip connection device 12 can be disposed in a corresponding receptacle 105 defined by the stand 104, which is extended outwardly from the bottom surface of the base 101 of the housing 10. The contact member 121 of the conductor strip connection device 12 can be fastened and locked by the hooks 106 of the base 101. Alternatively, the contact member 121 of the conductor strip connection device 12 can be mounted on the bottom surface of the base 101 of the housing 10 by embedding, insert molding, screwing, engaging, or adhesive, and it is not limited thereto.

Figure 4A:
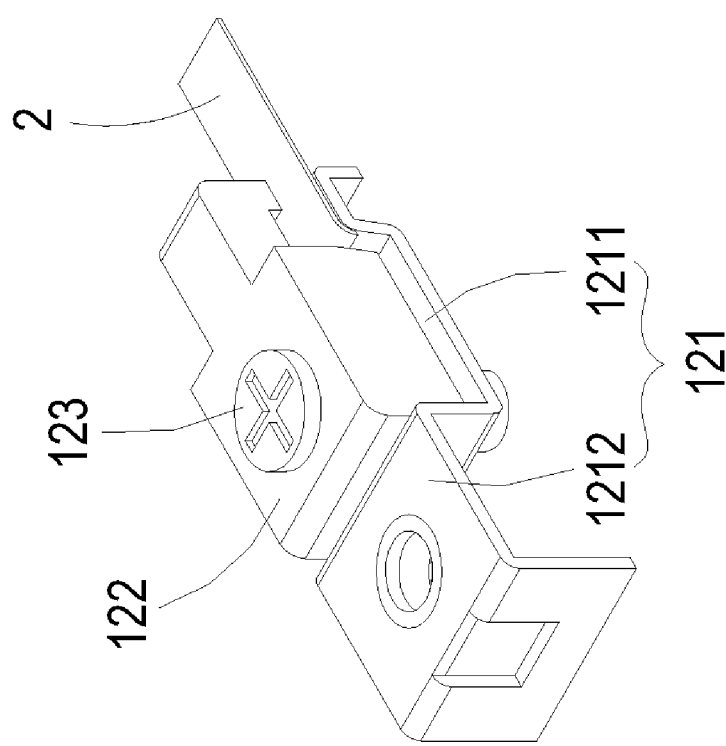
FIG. 4A is a schematic view showing another conductor strip connection device of the electrical connection mechanism of FIG. 2B.
Figure 4B:
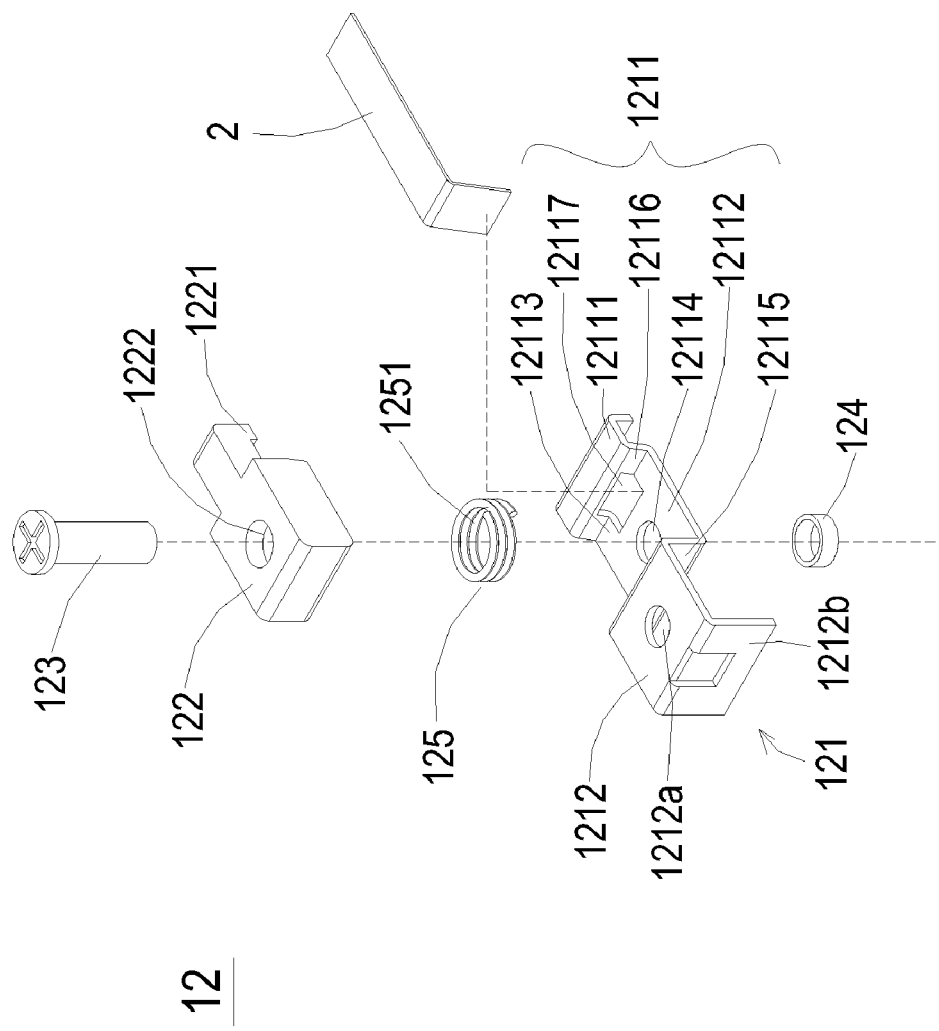
FIG. 4B is an exploded diagram of the conductor strip connection device of FIG. 4A.

FIG. 4A is a schematic view showing another conductor strip connection device of the electrical connection mechanism of FIG. 2B; and FIG. 4B is an exploded diagram of the conductor strip connection device of FIG. 4A. As shown in FIGS. 2B, 4A and 4B, each of the conductor strip connection devices 12 includes a contact member 121, a suppressing member 122, a fastening member 123 and a resilient member 125. The contact member 121 is made of metal material and includes a contact segment 1211 and a fixing segment 1212. The contact segment 1211 is configured to contact with a conductor strip 2 of the solar module. The fixing segment 1212 is connected with the contact segment 1211 and configured to connect with a corresponding electricity conveying element of the current-path arrangement module 13 by fastening element. The suppressing member 122 is made of metal material and includes a suppressing part 1221 configured to cooperate with the contact segment 1211 of the contact member 121 for clamping and securing the conductor strip 2 of the solar module. The fastening member 123 is configured to assemble the suppressing member 122 and the contact member 121 together or disassemble the suppressing member 122 from the contact member 121 so that the suppressing member 122 can cooperate with the contact segment 1212 of the contact member 121 for clamping or releasing the conductor strip 2. The resilient member 125 is disposed between the contact segment 1211 of the contact member 121 and the suppressing member 122 for urging against the contact member 121 and the suppressing member 122 so as to provide a resilient force to push the suppressing member 122 away from the contact member 121 when the fastening member 123 is released.

In an embodiment, the contact segment 1211 comprises a first portion 12111 and a second portion 12112. The second portion 12112 is connected with and between the first portion 12111 and the fixing segment 1212, and the second portion 12112 is offset from the first portion 12111 and the fixing segment 1212 and forms a receiving portion 12113 for receiving the suppressing member 122. Preferably, the suppressing part 1221 is extending outwardly from one side of the suppressing member 122 and configured to cooperate with the first portion 12111 of the contact segment 1211 for clamping or releasing the conductor strip 2. In an embodiment, the second portion 12112 of the contact segment 1211 includes a first through hole 12114 and two sidewalls 12115, 12116, and the suppressing member includes a second through hole 1222. The sidewall 12116 has a through slot 12117 for installing the end portion of the conductor strip 2. The fixing segment 1212 includes a through hole 1212a and a leg 1212b. Preferably, the suppressing member 122 is a wedge. Preferably, the fastening member 123 is quick release screw, and it is not limited thereto.

When the user wants to assemble and connect the conductor strip 2 with the junction box 1, one end portion of the conductor strip 2 can be folded and placed on the contact segment 1211 of contact member 121 so that the conductor strip 2 can contact with one sidewall 12116 of the second portion 12112 and the first portion 12111 of the contact member 121. Then, the suppressing member 122 is installed into the receiving portion 12113 of the second portion 12112 for pressing the conductor strip 2, and the fastening member 123 is employed to pass through the second through hole 1222 of the suppressing member 122, the opening 1251 of the resilient member 125 and the first through hole 12114 of the contact member 121 and couples with a coupling element 124. Therefore, the suppressing member 122 can cooperate with the contact segment 1211 of the contact member 121 for clamping the conductor strip 2 and the conductor strip 2 can be securely fastened to the conductor strip connection device 12. When the user wants to disconnect the conductor strip 2 with the conductor strip connection device 12 of the junction box 1, the fastening member 123 is released and the resilient member 125 urges against the suppressing member 122 so that the suppressing part 1221 of the suppressing member 122 is apart from the contact segment 1211 of the contact member 121 to form a gap and the conductor strip 2 can be released.

Figure 5A:
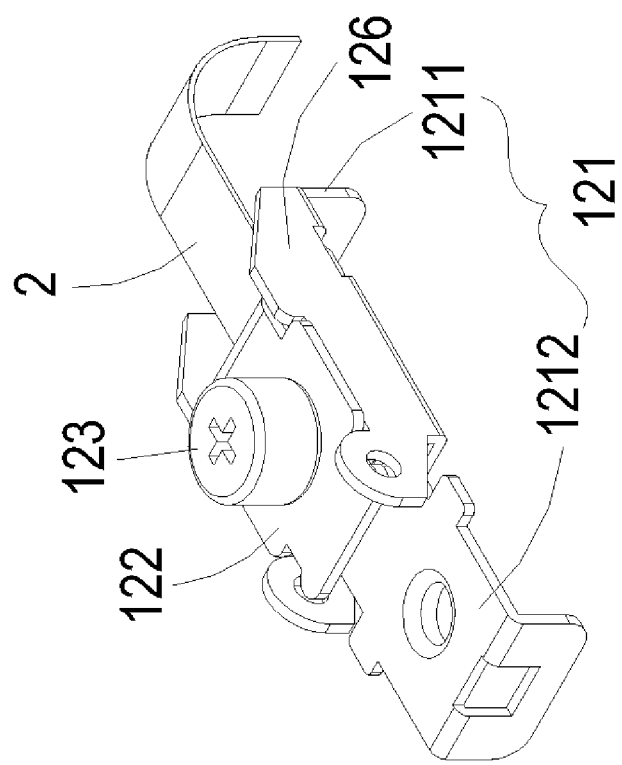
FIG. 5A is a schematic view showing another conductor strip connection device of the electrical connection mechanism of FIG. 2.
Figure 5B:
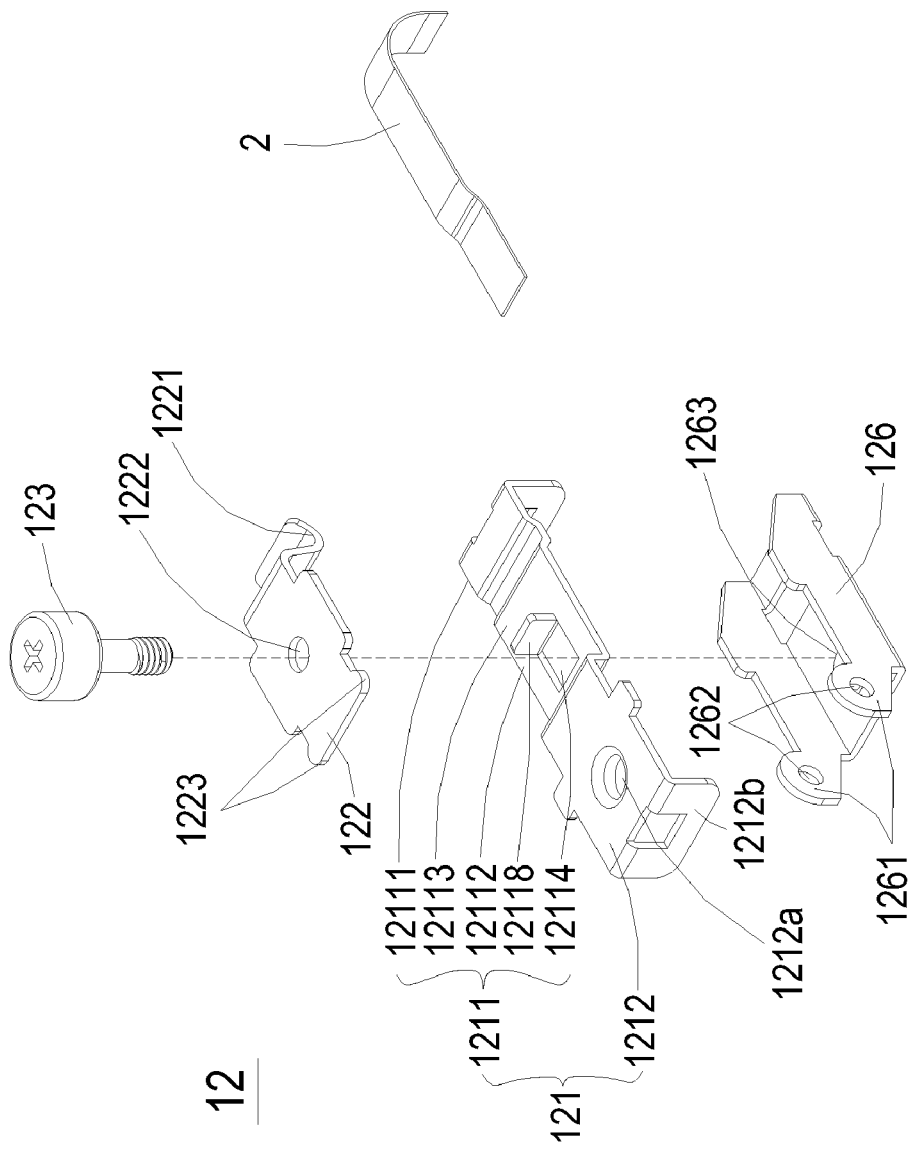
FIG. 5B is an exploded diagram of the conductor strip connection device of FIG. 5A.

FIG. 5A is a schematic view showing another conductor strip connection device of the electrical connection mechanism of FIG. 2B; and FIG. 5B is an exploded diagram of the conductor strip connection device of FIG. 5A. As shown in FIGS. 2, 5A and 5B, each of the conductor strip connection devices 12 includes a contact member 121, a suppressing member 122, a fastening member 123 and a frame 126. The contact member 121 is made of metal material and includes a contact segment 1211 and a fixing segment 1212. The contact segment 1211 is configured to contact with a conductor strip 2 of the solar module. The fixing segment 1212 is connected with the contact member and configured to connect with a corresponding electricity conveying element of the current-path arrangement module 13 by fastening element. The contact member 121 is disposed between the frame 126 and the suppressing member 122. The suppressing member 122 is made of metal material and includes a suppressing part 1221 configured to cooperate with the contact segment 1211 of the contact member 121 for clamping and securing the conductor strip 2 of the solar module. The suppressing member 122 further comprises a pivotal portion 1223 and the frame 126 comprises two arms 1261, each of which has a bore 1262 for installing the pivotal portion 1223 of the suppressing member 122 so that the suppressing member 122 can pivotally connected with the frame 126. The fastening member 123 is configured to fasten the suppressing member 122 and the contact member 121 together so that the suppressing member 122 can cooperate with the contact segment 1211 of the contact member 121 for clamping or releasing the conductor strip 2.

In an embodiment, the contact segment 1211 comprises a first portion 12111 and a second portion 12112. The second portion 12112 is connected with and between the first portion 12111 and the fixing segment 1212, and the second portion 12112 is offset from the first portion 12111 and the fixing segment 1212 and forms a receiving portion 12113 for receiving the suppressing member 122. In an embodiment, the second portion 12112 of the contact segment 1211 includes a first through hole 12114, the suppressing member includes a second through hole 1222, and the frame 126 includes a third through hole 1263. The fixing segment 1212 includes a through hole 1212a and a leg 1212b. Preferably, the suppressing member 122 is a wedge. Preferably, the fastening member 123 is quick release screw, and it is not limited thereto.

When the user wants to assemble and connect the conductor strip 2 with the junction box 1, one end portion of the conductor strip 2 can be placed on the contact segment 1211 of contact member 121 so that the conductor strip 2 can contact with the second portion 12112 and the first portion 12111 of the contact member 121. Then, the suppressing member 122 is rotated from a first position toward a second position so that the suppressing part 1221 can press the conductor strip 2, and the fastening member 123 is employed to pass through the second through hole 1222 of the suppressing member 122, the first through hole 12114 of the second portion 12112 and the third through hole 1263 of the frame 126 so that the conductor strip 2 can be securely fastened to the conductor strip connection device 12. When the user wants to disconnect the conductor strip 2 with the conductor strip connection device 12 of the junction box 1, the fastening member 123 is released and the suppressing member 122 is rotated from the second position toward the first position so that the suppressing part 1221 of the suppressing member 122 is apart from the contact segment 1211 of the contact member 121 to form a gap and the conductor strip 2 can be released.

Figure 6A:
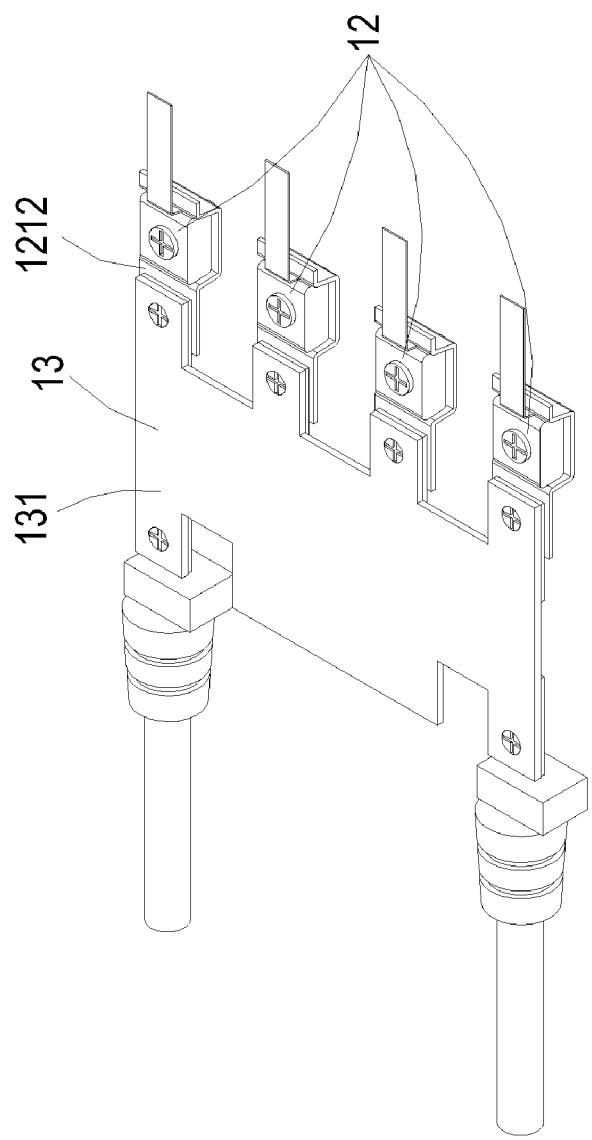
FIGS. 6A and 6B are the front and rear views showing the current-path arrangement module of the electrical connection mechanism of FIG. 2B, respectively.
Figure 6B:
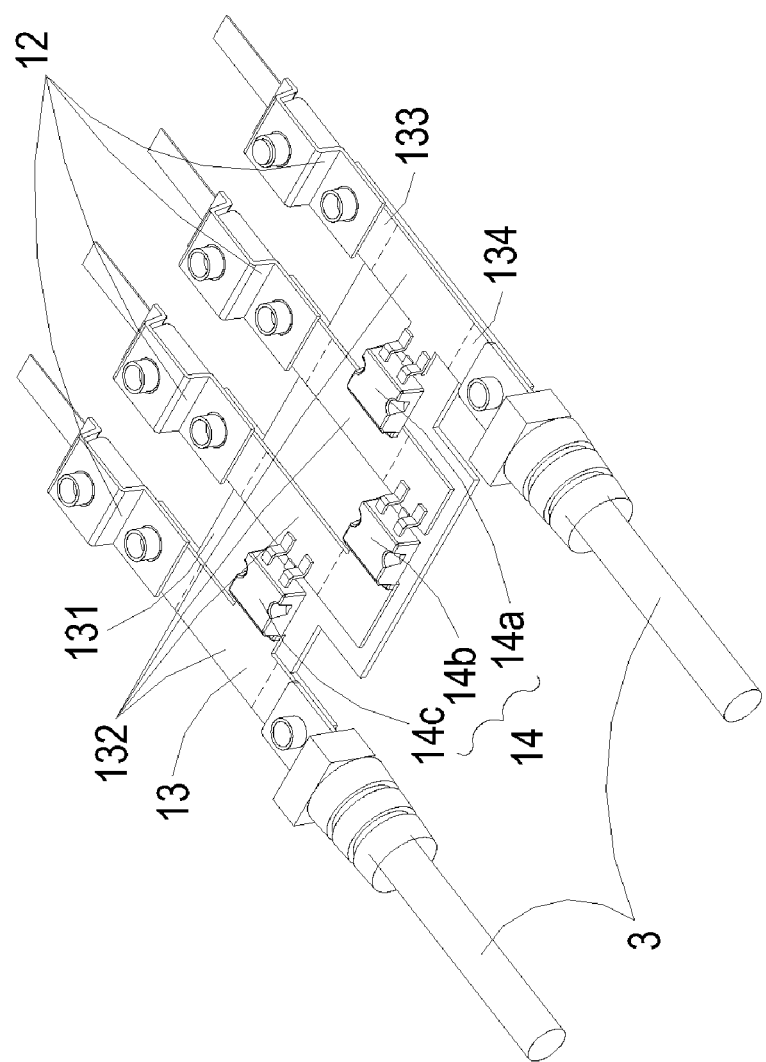

FIGS. 6A and 6B are the front and rear views showing the current-path arrangement module of the electrical connection mechanism of FIG. 2B, respectively. As shown in FIGS. 6A and 6B, the current-path arrangement module 13 is detachably connected with the conductor strip connection devices 12 and the electrical cables 3 and includes a carrier 131, a plurality of electricity conveying elements 132 and a plurality of electronic components 14. The electricity conveying elements 132 are separately disposed on one surface of the carrier 131 to form a plurality of electricity conveying paths. The electronic components 14 are disposed on the carrier 131, and each electronic component 14 is connected to two adjacent electricity conveying elements 132 so as to form a current-path arrangement as required. In an embodiment, the carrier 131 is a printed circuit board or wiring board, the electricity conveying elements 132 are electrical conductive traces disposed on one surface of the carrier 131, and the electronic components 14 are bypass diodes. More preferably, there are four electricity conveying elements 132 and three bypass diodes 14a, 14b, 14c mounted on the rear surface of the carrier 131. The electricity conveying element 132 includes a first connection pad 133 disposed on a first side edge of the carrier 131 and a second connection pad 134 disposed on a second side edge of the carrier 131 opposite to the first side edge. The first connection pads 133 of the electricity conveying elements 132 are coupled and connected with the fixing segments 1212 of the contact members 121 of the conductor strip connection devices 12 by fastening elements, for example screws, but it is not limited thereto. Two of the second connection pads 134 of the electricity conveying elements 132 are coupled and connected with the contact portions of the electrical cables 3 by fastening members, for example screws, but it is not limited thereto. By using the current-path arrangement module 13, the bypass diodes 14a, 14b, 14c can be replaced and maintained easily by replacing the current-path arrangement module 13 with another one when one or more bypass diodes 14a, 14b, 14c is breakdown or failed.

Figure 7A:
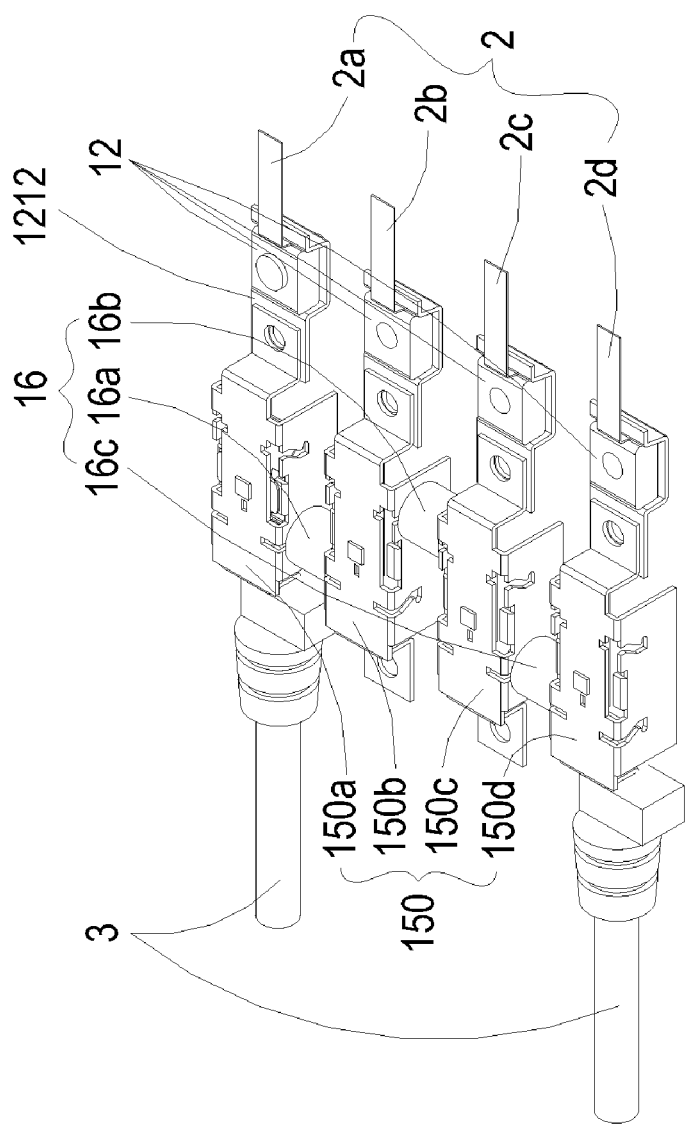
FIG. 7A is a schematic view showing an electrical connection mechanism with another current-path arrangement module according to the present invention.
Figure 7B:
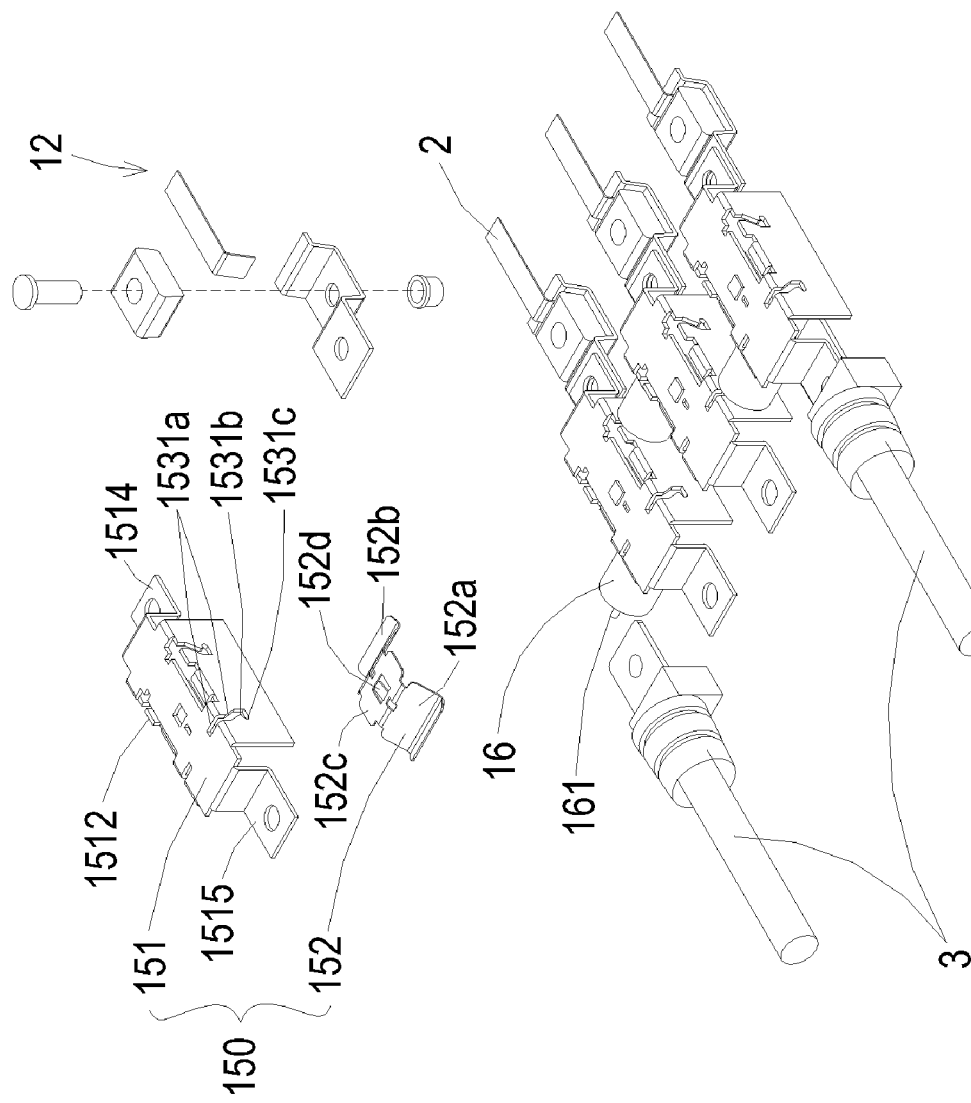
FIG. 7B is an exploded diagram showing the current-path arrangement module of FIG. 7A.

FIG. 7A is a schematic view showing an electrical connection mechanism with another current-path arrangement module according to the present invention; and FIG. 7B is an exploded diagram showing the current-path arrangement module of FIG. 7A. As shown in FIGS. 7A and 7B, the electrical connection mechanism 11 includes a plurality of the conductor strip connection devices 12 and a current-path arrangement module 15. The current-path arrangement module 15 is detachably connected with the conductor strip connection devices 12 and the electrical cables 3 and includes a plurality of electricity conveying elements 150 and a plurality of electronic components 16. The electricity conveying elements 150 are configured to form a plurality of electricity conveying paths. Each electronic component 16 is connected to two adjacent electricity conveying elements 150 so as to form a current-path arrangement as required. The electricity conveying elements 150 are electrical conductive rails, and the electronic components 16 are bypass diodes. More preferably, there are four electrical conductive rails 150a, 150b, 150c, 150d and three bypass diodes 16a, 16b, 16c. In an embodiment, each bypass diode 16a, 16b, 16c has two terminals connected and fastened to two adjacent electrical conductive rails 150a, 150b, 150c, 150d of the current-path arrangement module 15.

Figure 7C:
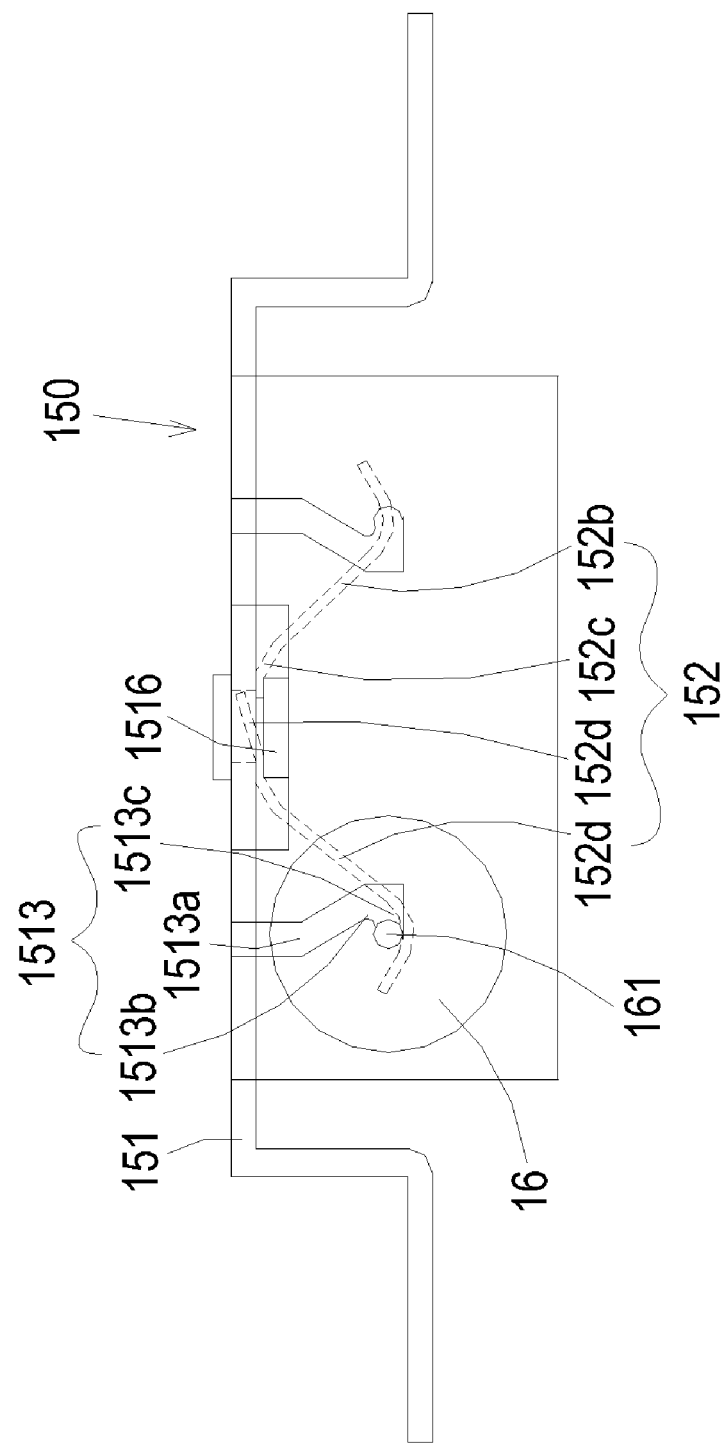
FIG. 7C is a schematic view showing the assembly of the electronic components and the electricity conveying elements of FIGS. 7A and 7B.

FIG. 7C is a schematic view showing the assembly of the electronic components and the electricity conveying elements of FIGS. 7A and 7B. As shown in FIGS. 7A, 7B and 7C, each of the electricity conveying elements 150 includes a main body 151 and a resilient member 152. The main body 151 has a first sidewall 1511 and a second sidewall 1512 opposite to the first sidewall 1511. Each of the sidewall 1511, 1512 has at least one sliding slot 1513. The sliding slot 1513 includes plural guiding segments 1513a, a curve segment 1513b and a bottom segment 1513c (i.e. position segment). The resilient member 152 has two arms 152a, 152b and a connection portion 152c. At least one engaging element 152d is extended outwardly from the connection portion 152c and secured to a corresponding engaging element 1516 in the inner surface of the main body 151 of the electricity conveying element 150 so that the resilient member 152 is disposed in the interior of the electricity conveying element 150 and the two arms 152a, 152b are disposed adjacent to the sliding slots 1513 of the main body 151. The main body 151 of the electricity conveying element 150 further includes a first connection pad 1514 and a second connection pad 1515. The first connection pad 1514 of the electricity conveying element 150 is connected and fastened with the fixing segment 1212 of the contact member 121 of the conductor strip connection device 12 by a fastening element, for example screw, and it is not limited thereto. The second connection pad 1515 of the electricity conveying element 150 is connected and fastened with a corresponding electrical cable 3 by fastening element, for example screw, and it is not limited thereto.

When one terminal 161 of the electronic component 16 (i.e. bypass diode 16) is inserted into a corresponding sliding slot 1513 of the main body 151 of the electricity conveying element 150 and guided by the guiding segments 1513a, the terminal 161 of the bypass diode 16 will urge against the arm 152a or 152b of the resilient member 152 during the sliding motion. When the terminal 161 of the bypass diode 16 is pressed and guided toward the bottom segment 1513c of the sliding slot 1513 and goes across the curve segment 1513b, the terminal 161 of the bypass diode 16 can be positioned in the bottom segment 1513c of the sliding slot 1513 due to the resilient recovery force and the suppressing force exerted by the resilient member 152. Namely, the terminal 161 of the bypass diode 16 can be positioned in the sliding slot 1513 by clipping or clamping method. By employing the electricity conveying element 150 as shown in FIGS. 7A, 7B and 7C, the bypass diodes 16 can be installed or replaced easily when installation or when one or more bypass diodes 16 is breakdown or failed.

Figure 8:
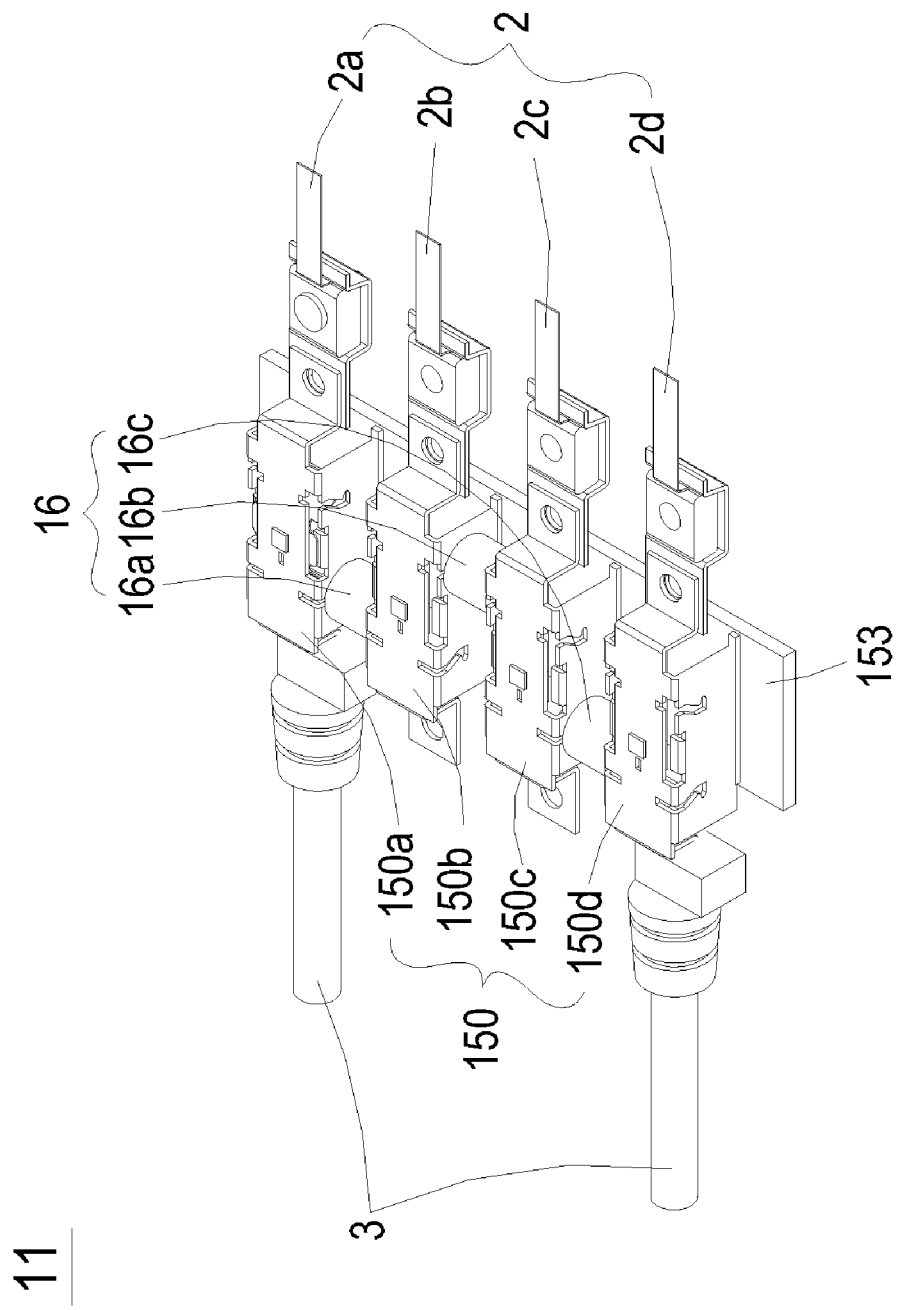
FIG. 8 is a schematic view showing an electrical connection mechanism with another current-path arrangement module of FIG. 7.

FIG. 8 is a schematic view showing an electrical connection mechanism with another current-path arrangement module of FIG. 7. As shown in FIG. 8, the electrical connection mechanism 11 includes a plurality of the conductor strip connection devices 12 and a current-path arrangement module 15. The current-path arrangement module 15 is detachably connected with the conductor strip connection devices 12 and the electrical cables 3 and includes a plurality of electricity conveying elements 150, a plurality of electronic components 16 and a carrier 153. The electricity conveying elements 150 are separately disposed on one surface of the carrier 153 to form a plurality of electricity conveying paths. The electronic components 16 are disposed on the carrier 153, and each electronic component 16 is connected to two adjacent electricity conveying elements 150 so as to form a current-path arrangement as required. In an embodiment, the carrier 153 is a supporting plate for supporting and mounting the electricity conveying elements 150 and the electronic components 16 thereon, the electricity conveying elements 150 are electrical conductive rails disposed on one surface of the carrier 153, and the electronic components 16 are bypass diodes. The electrical conductive rails 150 can be mounted on one surface of the carrier 153 by rails, embedding, engaging, locking or adhesive, and it is not limited thereto. The carrier 153 can be mounted on the bottom surface of the base 101 of the housing 10 by screwing, locking or engaging, and it is not limited thereto. By using the current-path arrangement module 15, the bypass diodes 16 can be replaced and maintained easily by replacing the current-path arrangement module 15 with another one when one or more bypass diodes 16 is breakdown or failed.

Figure 9A:
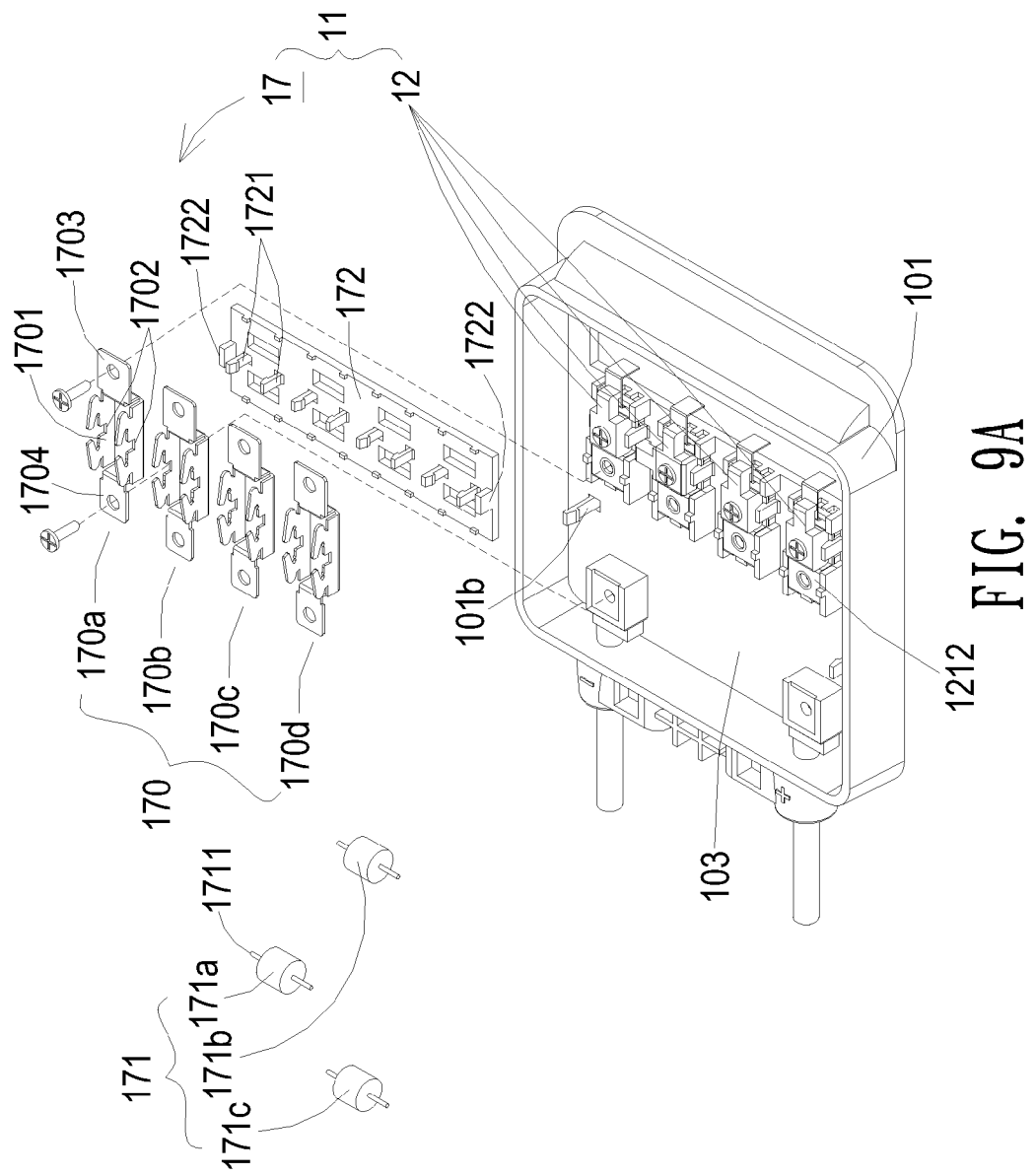
FIG. 9A is a schematic view showing an electrical connection mechanism with another current-path arrangement module according to the present invention.
Figure 9B:
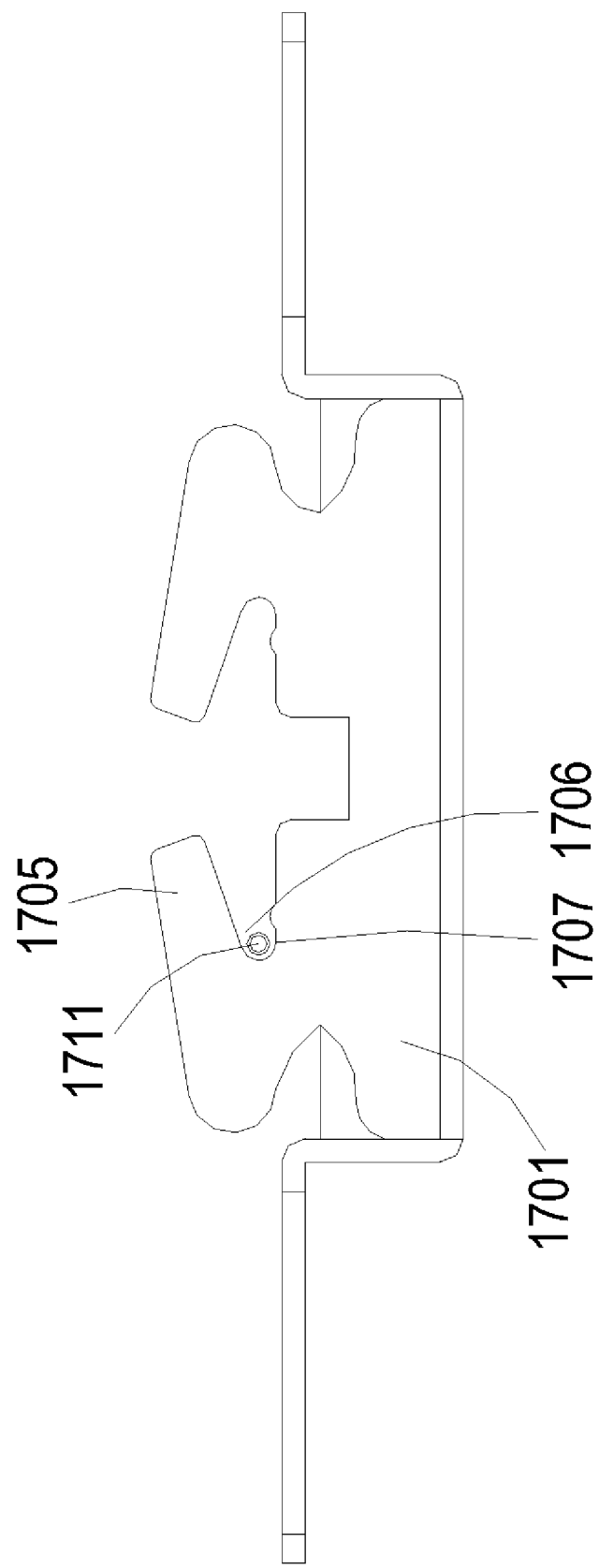
FIG. 9B is a schematic view showing the assembly of the electronic components and the electricity conveying elements of FIG. 9A.

FIG. 9A is a schematic view showing an electrical connection mechanism with another current-path arrangement module according to the present invention; and FIG. 9B is a schematic view showing the assembly of the electronic components and the electricity conveying elements of FIG. 9A. As shown in FIGS. 9A and 9B, the electrical connection mechanism 11 includes a plurality of conductor strip connection devices 12 and a current-path arrangement module 17. The current-path arrangement module 17 is detachably connected with the conductor strip connection devices 12 and the electrical cables 3 and includes a plurality of electricity conveying elements 170, a plurality of electronic components 171 and a carrier 172. The electricity conveying elements 170 are separately disposed on one surface of the carrier 172 to form a plurality of electricity conveying paths. The electronic components 171 are disposed on the carrier 172, and each electronic component 171 is connected to two adjacent electricity conveying elements 170 so as to form a current-path arrangement as required. In an embodiment, the carrier 172 is a supporting plate for supporting and mounting the electricity conveying elements 170 and the electronic components 171 thereon, the electricity conveying elements 170 are electrical conductive rails disposed on one surface of the carrier 172, and the electronic components 171 are bypass diodes. More preferably, there are four electrical conductive rails 170a, 170b, 170c, 170d and three bypass diodes 171a, 171b, 171c mounted on one surface of the carrier 172. In an embodiment, each bypass diode 171a, 171b, 171c has two terminals connected to two adjacent electrical conductive rails 170a, 170b, 170c, 170d of the current-path arrangement module 17. The electrical conductive rails 170a, 170b, 170c, 170d can be mounted on one surface of the carrier 172 by rails, embedding, engaging, locking or adhesive, and it is not limited thereto. The carrier 172 can be mounted on the bottom surface in the receptacle 103 of the base 101 of the housing 10 by screwing, locking or engaging, and it is not limited thereto. By using the current-path arrangement module 17, the bypass diodes 171a, 171b, 171c can be replaced and maintained easily by replacing the current-path arrangement module 17 with another one when one or more bypass diodes 171a, 171b, 171c is breakdown or failed.

In an embodiment, each of the electricity conveying elements 170 includes a main body 1701. The main body 1701 has at least one engaging element 1702. The carrier 172 has a plurality of engaging elements 1721 for engaging with the engaging elements 1702 of the electricity conveying elements 170. Preferably, the engaging elements 1721 of the carrier 172 are hooks and the engaging elements 1702 of the electricity conveying elements 170 are engaging slots, and it is not limited thereto. The carrier 172 can be secured on the bottom surface of the receptacle 103 of the base 101. The carrier 172 further includes one or more securing element 1722 and the base 101 includes one or more securing element 101b for fastening with the securing element 1722 of the carrier 172 so that the carrier 172 can be secured on the bottom surface of the receptacle 103 of the base 101. The main body 1701 of the electricity conveying element 170 further includes a first connection pad 1703 and a second connection pad 1704. The first connection pad 1703 of the electricity conveying element 170 is connected and fastened with the fixing segment 1212 of the contact member 121 of the conductor strip connection devices 12 by fastening element, for example screw, and it is not limited thereto. The second connection pad 1704 of the electricity conveying element 170 is connected and fastened with a corresponding electrical cable 3 by fastening element, for example screw, and it is not limited thereto.

As shown in FIGS. 9A and 9B, the main body 1701 of the electricity conveying element 170 further includes a plurality of extending arms 1705 and a plurality of receiving slots 1706. Each of the receiving slots 1706 includes a bottom segment 1707 (i.e. position segment) for receiving one terminal 1711 of the electronic component 171. When the terminal 1711 of the electronic component 171 is pressed and guided toward the bottom segment 1707 of the receiving slot 1706, the terminal 1711 of the electronic component 171 can be positioned in the bottom segment 1707 of the receiving slot 1706 by punching the adjacent arm 1705 downwardly so as to clamp the terminal 1711 inside the bottom segment 1707 of the receiving slot 1706. Namely, the terminal 1711 of the electronic component 171 can be positioned in the bottom segment 1707 of the receiving slot 1706 by clamping method.

Figure 10:
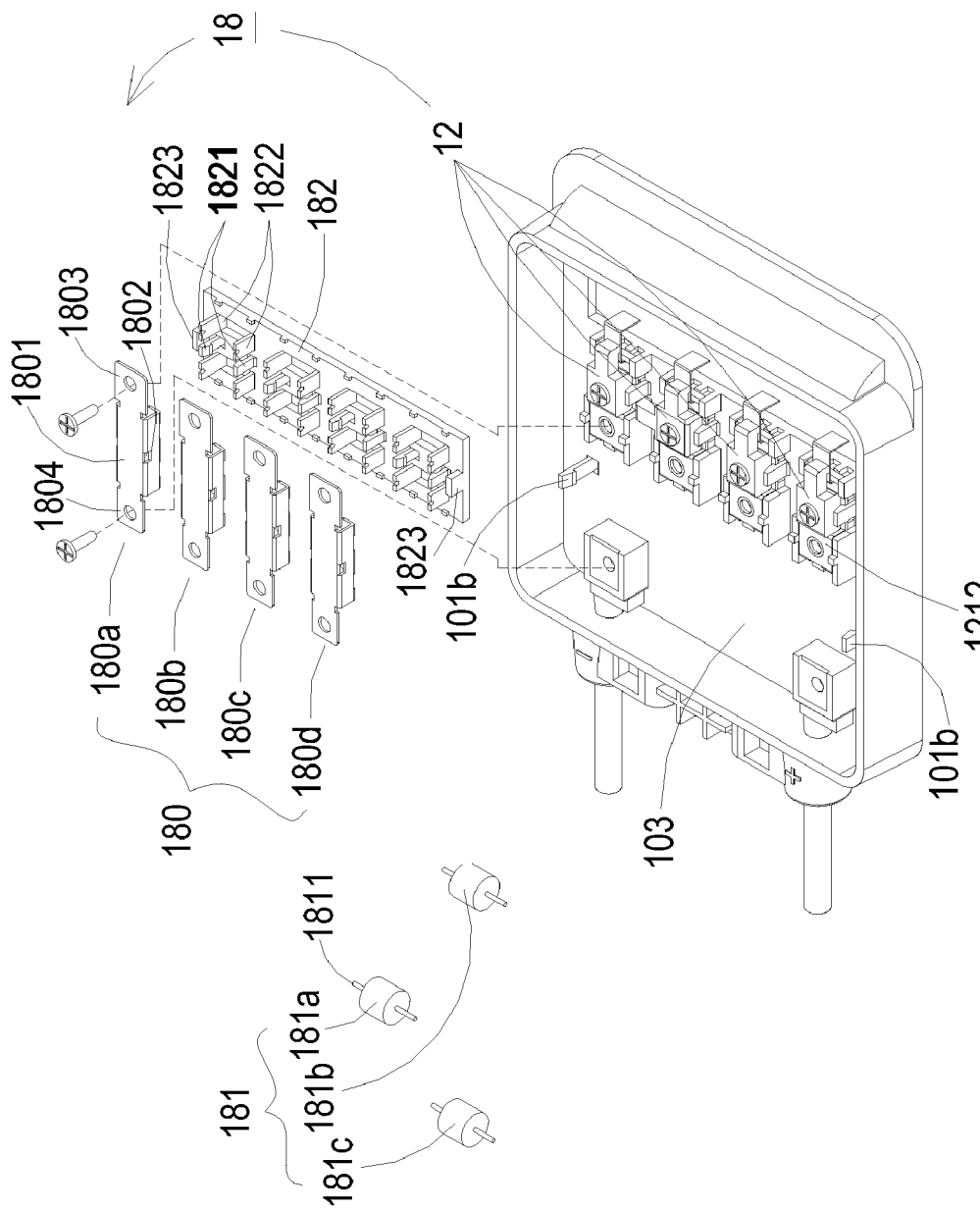
FIG. 10 is a schematic view showing an electrical connection mechanism with another current-path arrangement module according to the present invention.

FIG. 10 is a schematic view showing an electrical connection mechanism with another current-path arrangement module according to the present invention. As shown in FIG. 10, the electrical connection mechanism 11 includes a plurality of conductor strip connection devices 12 and a current-path arrangement module 18. The current-path arrangement module 18 is detachably connected with the conductor strip connection devices 12 and the electrical cables 3 and includes a plurality of electricity conveying elements 180, a plurality of electronic components 181 and a carrier 182. The electricity conveying elements 180 are separately disposed on one surface of the carrier 182 to form a plurality of electricity conveying paths. The electronic components 181 are disposed on the carrier 182, and each electronic component 181 is connected to two adjacent electricity conveying elements 180 so as to form a current-path arrangement as required. In an embodiment, the carrier 182 is a supporting plate for supporting and mounting the electricity conveying elements 180 and the electronic components 181 thereon, the electricity conveying elements 180 are electrical conductive rails disposed on one surface of the carrier 182, and the electronic components 181 are bypass diodes. More preferably, there are four electrical conductive rails 180a, 180b, 180c, 180d and three bypass diodes 181a, 181b, 181c mounted on one surface of the carrier 182. In an embodiment, each bypass diode 181a, 181b, 181c has two terminals connected to two adjacent electrical conductive rails 180a, 180b, 180c, 180d of the current-path arrangement module 18. The electrical conductive rails 180a, 180b, 180c, 180d can be mounted on one surface of the carrier 182 by rails, embedding, engaging, locking or adhesive, and it is not limited thereto. The carrier 182 can be mounted on the bottom surface in the receptacle 103 of the base 101 of the housing 10 by screwing, locking or engaging, and it is not limited thereto. By using the current-path arrangement module 18, the bypass diodes 181a, 181b, 181c can be replaced and maintained easily by replacing the current-path arrangement module 18 with another one when one or more bypass diodes 181a, 181b, 181c is breakdown or failed.

In an embodiment, each of the electricity conveying elements 180 includes a main body 1801. The main body 1801 has at least one engaging element 1802. The carrier 182 has a plurality of engaging elements 1821 for engaging with the engaging elements 1802 of the electricity conveying elements 180. Preferably, the engaging elements 1821 of the carrier 182 are hooks and the engaging elements 1802 of the electricity conveying elements 180 are engaging holes, and it is not limited thereto. The carrier 182 includes a plurality of supporting elements 1822 for supporting and securing the terminals 1811 of the electronic components 181 so that the terminals 1811 of the electronic components 181 can be coupled to the electricity conveying elements 180. Preferably, the supporting elements 1822 are protrusion rods with clamping arms. The carrier 182 can be secured on the bottom surface of the receptacle 103 of the base 101. The carrier 182 further includes one or more securing element 1823 and the base 101 includes one or more securing element 101b for fastening with the securing element 1823 of the carrier 182 so that the carrier 182 can be secured on the bottom surface of the receptacle 103 of the base 101. The main body 1801 of the electricity conveying element 180 further includes a first connection pad 1803 and a second connection pad 1804. The first connection pad 1803 of the electricity conveying element 180 is connected and fastened with the fixing segment 1212 of the contact member 121 of the conductor strip connection devices 12 by fastening element, for example screw, and it is not limited thereto. The second connection pad 1804 of the electricity conveying element 180 is connected and fastened with a corresponding electrical cable 3 by fastening element, for example screw, and it is not limited thereto.

To sum up, the junction box of the present application is simple in construction, cost-effective, durable enough to withstand a wide range of environment conditions and easily be assembled, installed and maintained. In addition, the junction box of the present application includes a conductor strip connection device capable of assembling, fastening and coupling the thin conductor strip of the solar module to the junction box easily and conveniently. Moreover, the junction box of the present invention can maintain a high-quality, reliable electrical connections between the components of a solar or photovoltaic system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A junction box, comprising:
   a housing having an opening for introducing a plurality of conductor strips thereinto; and
   an electrical connection mechanism disposed in a receptacle of said housing and comprising:
      a plurality of conductor strip connection devices separately disposed on an inner surface of said housing for connecting to said conductor strips; and
      a current-path arrangement module comprising a plurality of electricity conveying elements and a plurality of electronic components, wherein said electricity conveying elements are connected with said conductor strip connection devices respectively, and each said electronic component is connected with two adjacent electricity conveying elements;
   wherein each of said conductor strip connection devices comprises:
      a contact member having a contact segment;
      a suppressing member having a suppressing part configured to cooperate with said contact segment of said contact member for securing said corresponding conductor strip; and
      a fastening member configured to fasten the suppressing member on said contact segment of said contact member or disassemble said suppressing member from said contact member for allowing said suppressing member to cooperate with said contact segment of said contact member so as to secure or release said conductor strip.

2. The junction box according to claim 1, wherein said contact member further comprises a fixing segment connected with said contact segment and configured to connect with a corresponding electricity conveying element of said current-path arrangement module.

3. The junction box according to claim 2, wherein said contact segment of said contact member comprises a first portion and a second portion, and said second portion is connected with and between said first portion and said fixing segment.

4. The junction box according to claim 3, wherein said second portion is offset from said first portion and said fixing segment and has a receiving portion for receiving said suppressing member.

5. The junction box according to claim 3, wherein said second portion of said contact segment comprises a first through hole and two sidewalls, and said suppressing member comprises a second through hole.

6. The junction box according to claim 5, wherein said fastening member is configured to pass through said second through hole of said suppressing member and said first through hole of said contact member and couples with a coupling element.

7. The junction box according to claim 1, wherein said conductor strip connection device further comprises a resilient member disposed between said contact segment of said contact member and said suppressing member for urging against said contact member and said suppressing member.

8. The junction box according to claim 1, wherein said conductor strip connection device further comprises a frame, and said contact member is disposed between said frame and said suppressing member.

9. The junction box according to claim 8, wherein said suppressing member is pivotally connected with said frame.

10. The junction box according to claim 9, wherein said suppressing member further comprises a pivotal portion, and said frame comprises two arms, wherein each of said two arms has a bore for installing said pivotal portion of said suppressing member.

11. The junction box according to claim 1, wherein said suppressing member is a wedge.

12. The junction box according to claim 1, wherein said contact member is made of metal material.

13. The junction box according to claim 1, wherein said suppressing member is made of metal material.

14. The junction box according to the claim 1, wherein said electronic components are bypass diodes.

15. The junction box according to the claim 1, wherein said current-path arrangement module further comprises a carrier for supporting and mounting said electricity conveying elements and said electronic components thereon.

16. The junction box according to the claim 15, wherein and said electricity conveying elements are electrical conductive rails disposed on a surface of said carrier.

17. A conductor strip connection device for a junction box of a solar module, comprising:
 a contact member having a contact segment for connecting to a conductor strip;
 a suppressing member having a suppressing part configured to cooperate with said contact segment of said contact member for securing said conductor strip; and
 a fastening member configured to fasten the suppressing member on said contact segment of said contact member or disassemble said suppressing member from said contact member for allowing said suppressing member to cooperate with said contact segment of said contact member so as to secure or release said conductor strip.

* * * * *